(12) United States Patent
Aizawa et al.

(10) Patent No.: US 8,880,263 B2
(45) Date of Patent: Nov. 4, 2014

(54) CONTROL DEVICE FOR HYBRID VEHICLE

(75) Inventors: Takeo Aizawa, Hachioji (JP); Kakuzou Kaneko, Ebina (JP); Hirotaka Koyama, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/881,938

(22) PCT Filed: Oct. 11, 2011

(86) PCT No.: PCT/JP2011/073289
§ 371 (c)(1),
(2), (4) Date: Apr. 26, 2013

(87) PCT Pub. No.: WO2012/056870
PCT Pub. Date: May 3, 2012

(65) Prior Publication Data
US 2013/0218392 A1 Aug. 22, 2013

(30) Foreign Application Priority Data
Oct. 27, 2010 (JP) .................................. 2010-240381

(51) Int. Cl.
*B60W 20/00* (2006.01)
*B60L 11/00* (2006.01)
(Continued)

(52) U.S. Cl.
CPC ............. *B60W 20/106* (2013.01); *B60W 10/06* (2013.01); *B60L 11/12* (2013.01); *B60W 20/50*
(Continued)

(58) Field of Classification Search
CPC .......... B60W 20/106; B60W 2600/00; B60W 20/00; B60W 20/50; B60W 50/029; B60W 50/038; B60W 2710/086; B60W 2710/248; B60W 10/08; B60W 10/06; Y10S 903/903; B60K 6/48; B60L 11/12; B60L 11/14; B60L 11/0023; B60L 3/0023; Y02T 10/7005; Y02T 10/6221; Y02T 10/6286; Y02T 10/7077; F02D 41/22; F02D 29/02; F02N 11/04
USPC .................. 903/903; 701/22; 180/65.285
See application file for complete search history.

(56) References Cited

U.S. PATENT DOCUMENTS 5,415,605 A * 5/1995 Yoshimura et al. ........... 477/121
5,457,363 A * 10/1995 Yoshii et al. ................. 318/432
(Continued)

FOREIGN PATENT DOCUMENTS

JP 7-123509 A 5/1995
JP 09222036 A * 8/1997
(Continued)

OTHER PUBLICATIONS

Korean Office Action dated Jun. 27, 2014, (4 pgs.).

*Primary Examiner* — Calvin Cheung
*Assistant Examiner* — Angelina Shudy
(74) *Attorney, Agent, or Firm* — Foley & Lardner LLP

(57) ABSTRACT

A control device is provided for controlling a hybrid vehicle including an engine, a motor generator, and a battery arranged to be charged by and to discharge to the motor generator. The control device includes an abnormality judging section configured to judge whether or not an abnormality is generated in the engine. The control device further includes an assist prohibition section configured to prohibit the motor generator from being used as a power source when the abnormality is generated in the engine.

3 Claims, 12 Drawing Sheets

(51) Int. Cl.

| | | |
|---|---|---|
| *B60W 10/06* | (2006.01) | |
| *B60L 11/12* | (2006.01) | |
| *F02D 29/02* | (2006.01) | |
| *F02D 41/22* | (2006.01) | |
| *B60L 3/00* | (2006.01) | |
| *B60L 11/14* | (2006.01) | |
| *B60W 50/038* | (2012.01) | |
| *B60K 6/48* | (2007.10) | |
| *B60W 50/029* | (2012.01) | |
| *B60W 10/08* | (2006.01) | |
| *F02N 11/04* | (2006.01) | |

(52) U.S. Cl.
CPC ........ (2013.01); *F02D 29/02* (2013.01); *F02D 41/22* (2013.01); *B60W 2600/00* (2013.01); *Y02T 10/7005* (2013.01); *B60L 3/0023* (2013.01); *F02N 11/04* (2013.01); *Y02T 10/6286* (2013.01); *B60W 20/00* (2013.01); *B60L 11/14* (2013.01); *Y10S 903/903* (2013.01); *Y02T 10/7077* (2013.01); *B60W 50/038* (2013.01); *B60W 2710/248* (2013.01); *B60K 6/48* (2013.01); *B60W 50/029* (2013.01); *Y02T 10/6221* (2013.01); *B60W 10/08* (2013.01); *B60W 2710/086* (2013.01)
USPC ................... 701/22; 180/65.285; 903/903

(56) References Cited

U.S. PATENT DOCUMENTS

| | | | |
|---|---|---|---|
| 5,469,816 A | 11/1995 | Murakawa et al. | |
| 5,916,130 A * | 6/1999 | Nakae et al. | 60/276 |
| 6,321,150 B1 * | 11/2001 | Nitta | 701/32.7 |
| 6,359,405 B1 * | 3/2002 | Tsurumi | 318/434 |
| 6,522,024 B1 * | 2/2003 | Takaoka et al. | 290/40 C |
| 7,074,157 B2 * | 7/2006 | Wakashiro et al. | 477/7 |
| 7,163,487 B2 * | 1/2007 | Tao et al. | 477/3 |
| 7,383,902 B2 * | 6/2008 | Matsuzaki et al. | 180/65.285 |
| 7,482,769 B2 * | 1/2009 | Kutsuna et al. | 318/254.1 |
| 8,744,659 B2 * | 6/2014 | Yamagata et al. | 701/22 |
| 2002/0002430 A1 * | 1/2002 | Nada | 701/35 |
| 2002/0035006 A1 * | 3/2002 | Suzuki et al. | 477/3 |
| 2002/0091470 A1 * | 7/2002 | Sasazawa et al. | 701/22 |
| 2002/0147070 A1 * | 10/2002 | Izumiura et al. | 477/4 |
| 2003/0102175 A1 * | 6/2003 | Wakashiro et al. | 180/65.4 |
| 2004/0235613 A1 * | 11/2004 | Aoki et al. | 477/3 |
| 2005/0003925 A1 * | 1/2005 | Wakashiro et al. | 477/2 |
| 2005/0258796 A1 * | 11/2005 | Kusaka | 318/801 |
| 2007/0182350 A1 * | 8/2007 | Patterson et al. | 318/432 |
| 2008/0234914 A1 * | 9/2008 | Tabata et al. | 701/99 |
| 2008/0296908 A1 * | 12/2008 | Utsumi | 290/40 |
| 2008/0319633 A1 * | 12/2008 | Moriya et al. | 701/103 |
| 2009/0118980 A1 * | 5/2009 | Muta et al. | 701/103 |
| 2009/0133947 A1 * | 5/2009 | Yoshihara et al. | 180/65.285 |
| 2010/0087288 A1 * | 4/2010 | Yamamoto | 477/3 |
| 2010/0152938 A1 * | 6/2010 | Aoki et al. | 701/22 |
| 2010/0152940 A1 * | 6/2010 | Mitsutani et al. | 701/22 |
| 2011/0162602 A1 * | 7/2011 | Smith | 123/90.16 |
| 2011/0276213 A1 * | 11/2011 | Tomatsuri | 701/22 |
| 2012/0095630 A1 * | 4/2012 | Muto | 701/22 |
| 2013/0131904 A1 * | 5/2013 | Park et al. | 701/22 |
| 2013/0158767 A1 * | 6/2013 | Araki | 701/22 |

FOREIGN PATENT DOCUMENTS

| | | |
|---|---|---|
| JP | 2002-204503 A | 7/2002 |
| JP | 2003-169405 A | 6/2003 |
| JP | 2005-51830 A | 2/2005 |
| JP | 2007-314097 A | 12/2007 |
| JP | 2009-202662 A | 9/2009 |
| KR | 2002-0069543 A | 9/2002 |

* cited by examiner

FIG.5

| | B1 Fr/B | C1 I/C | C2 D/C | C3 H&LR/C | B2 LOW/B | B3 2346/B | B4 R/B | F1 | F2 |
|---|---|---|---|---|---|---|---|---|---|
| 1st | (O) | | | (O) | O | | | O | O |
| 2nd | | | | (O) | O | O | | | O |
| 3rd | | | O | | O | O | | | |
| 4th | | | O | O | | O | | | |
| 5th | | O | O | O | | | | | |
| 6th | | O | | O | | O | | | |
| 7th | O | O | | O | | | | O | |
| Rev. | O | | | O | | | O | | |

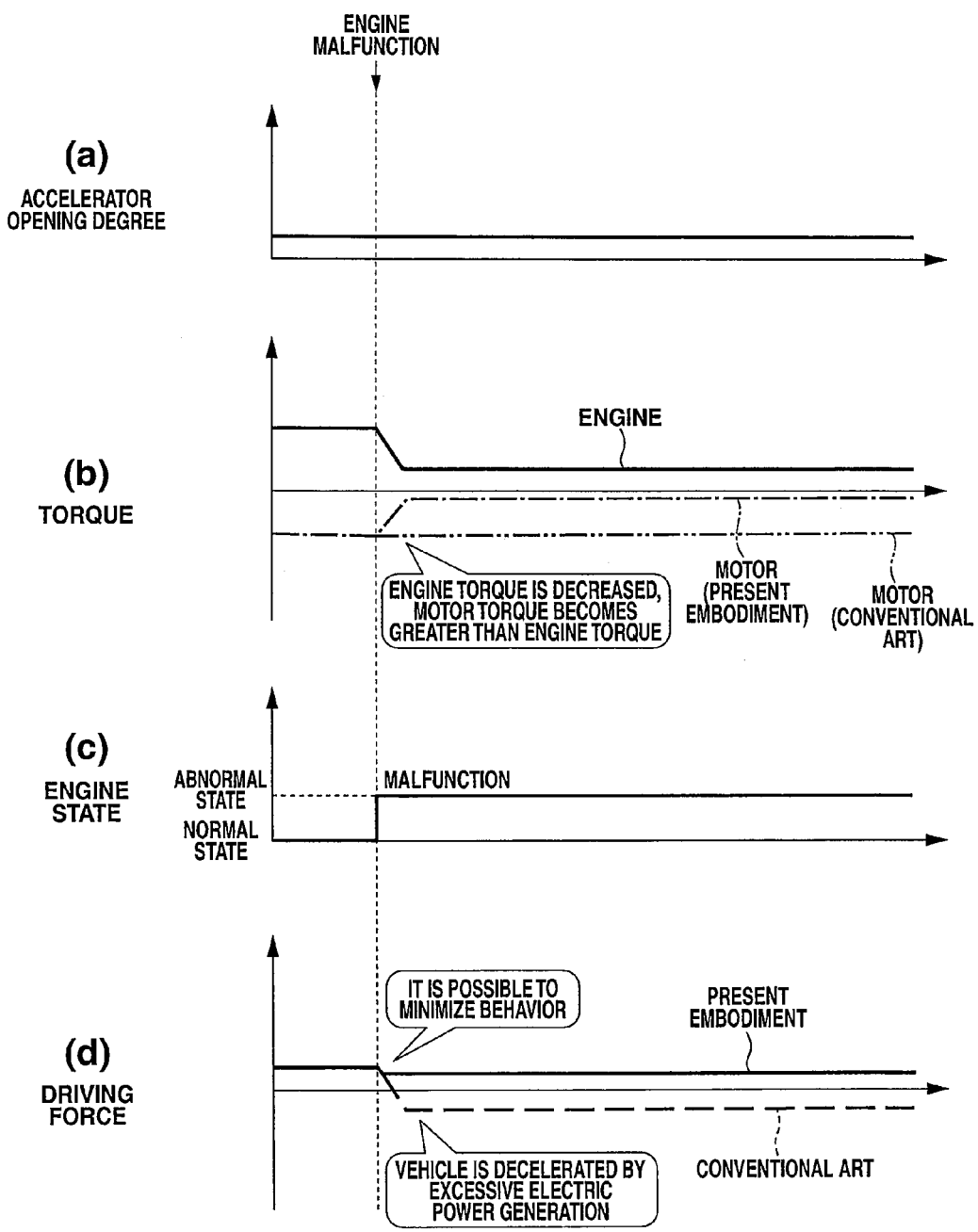

CONTROL DEVICE FOR HYBRID VEHICLE

TECHNICAL FIELD

This invention relates to a control device for a hybrid vehicle including an internal combustion engine, a motor generator, and a battery arranged to be charged by and discharge to the motor generator.

BACKGROUND ART

There is known an art in a hybrid vehicle equipped with a variable valve actuating mechanism (VEL), which is configured to prohibit an engine stop during running of a vehicle and during stop of the vehicle when the variable valve actuating mechanism is broken down (for example, cf. a patent document 1).

There is a problem that an SOC of a battery is decreased when a motor is frequently (heavily) used as a power source in a case where the engine torque is sufficiently outputted due to a malfunction and so on of the engine in a running mode in which the vehicle runs by using the engine and the motor as the power source.

It is the problems to be solved by the present invention to provide a control device for a hybrid vehicle which can protect a battery.

PRIOR ART DOCUMENT

Patent Document

Patent Document 1: Japanese Patent Application

SUMMARY OF THE INVENTION

In the present invention, it is judged whether or not an abnormality is generated in the internal combustion engine. When the abnormality is generated in the internal combustion engine, the use of the motor generator as the power source is prohibited. With this, the above-described problems are dissolved.

By the present invention, the use of the motor generator as the power source is prohibited when the abnormality is generated in the internal combustion engine.

Accordingly, it is possible to protect the battery even when the output torque of the internal combustion engine is decreased.

BRIEF DESCRIPTION OF DRAWINGS

FIG. 5 is a view showing a shift map of the automatic transmission shown in FIG. 4.

FIGS. 12(a)-12(d) are time charts showing another example of a flow of the assist prohibition control in the embodiments of the present invention.

DESCRIPTION OF EMBODIMENTS

Hereinafter, embodiments of the present invention will be illustrated with reference to the drawings.

Figure 1:
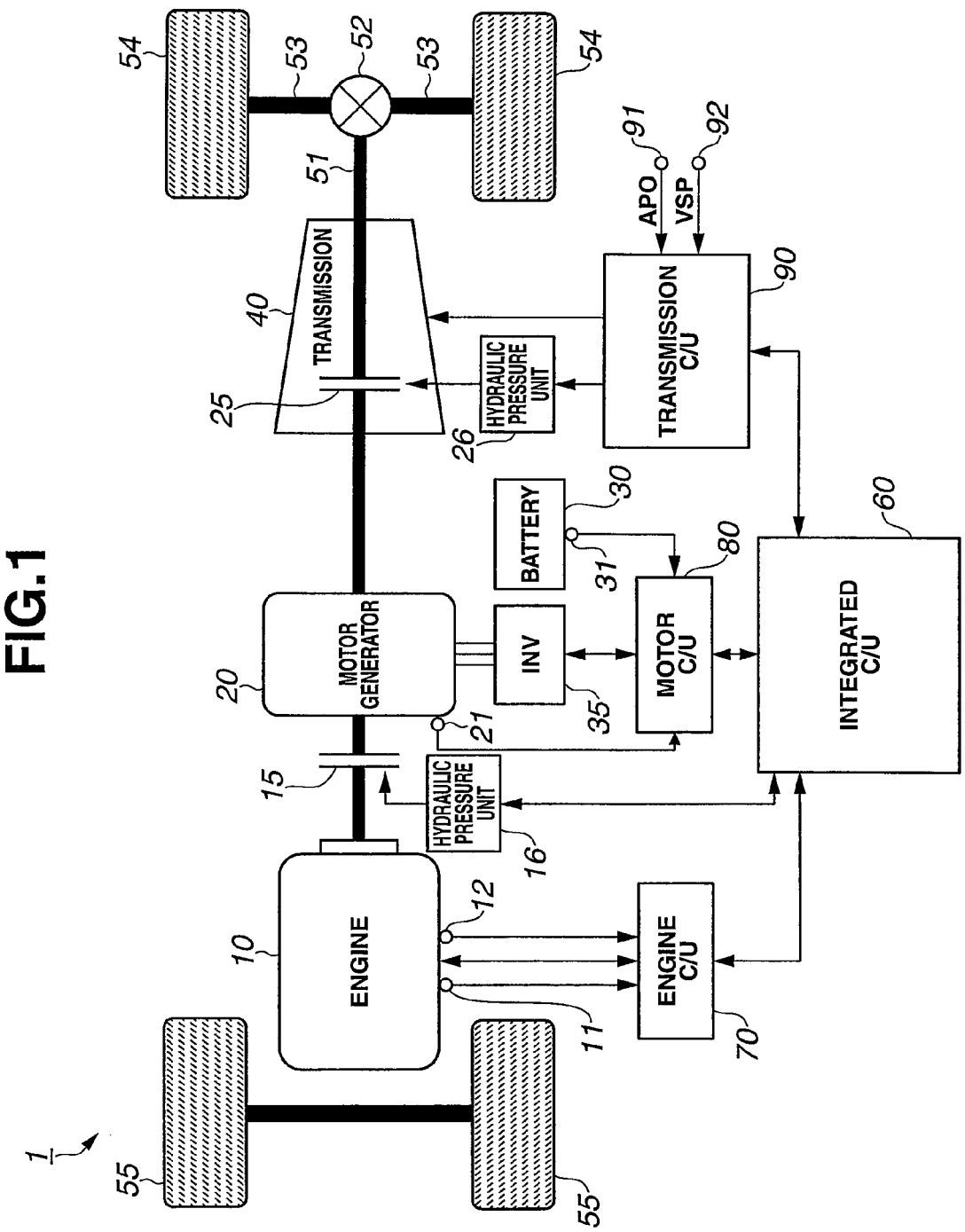
FIG. 1 is a block diagram showing an overall configuration of a hybrid vehicle according to one embodiment of the present invention.

A hybrid vehicle 1 in the present embodiment is a parallel electric vehicle which uses a plurality of driving sources for driving the vehicle. As shown in FIG. 1, this hybrid vehicle 1 includes an internal combustion engine (hereinafter, referred to as engine) 10, a first clutch 15, a motor generator (electric motor, electric generator) 20, a second clutch 25, a battery 30, an inverter 35, an automatic transmission 40, a propeller shaft 51, a differential gear unit 52, drive shafts 53, and left and right driving wheels 54.

The engine 10 is the internal combustion engine operated by a gasoline or a gas oil (light oil) as a fuel. In the engine 10, a valve opening degree of a throttle valve, a fuel injection amount of an injector, an ignition timing of a spark plug and so on are controlled based on a control signal from an engine control unit 70. This engine 10 is provided with a crank angle sensor 11 arranged to sense an engine speed Ne of the engine 10, and a water temperature sensor 12 arranged to sense a water temperature of an engine coolant.

The first clutch 15 is disposed between an output shaft of the engine 10 and a rotation shaft of the motor generator 20. The first clutch 15 is arranged to connect and disconnect a power transmission between the engine 10 and the motor generator 20. For example, this first clutch 15 is a wet-type multiple-plate clutch and so on in which a flow rate of a hydraulic fluid and a hydraulic pressure can be continuously controlled by a proportional solenoid. This first clutch 15 is arranged to engage (including a slip state) and disengage clutch plates by the hydraulic pressure of the hydraulic pressure unit 16 which is controlled based on the control signal from an integrated control unit 60.

The motor generator 20 is a synchronous motor generator including a rotor in which permanent magnets are embedded, and a stator around which a stator coil is wound. This motor generator 20 is provided with a resolver 21 arranged to sense a rotation angle of the rotor. This motor generator 20 acts as the electric motor, and acts as the electric generator. When a three-phase alternating-current (AC) power is supplied from the inverter 35, the motor generator 20 is drivingly rotated (a power running). On the other hand, when the rotor is rotated by an external force, the motor generator 20 generates an electromotive force at both ends of the stator coil, and thereby generates an alternating-current power (regeneration). The alternating-current power generated by the motor generator 20 is converted to the direct current by the inverter 35, and then charged to the battery 30.

For example, the battery 30 is a lithium-ion secondary battery or a nickel-hydrogen battery, and so on. A current/voltage sensor 31 is attached to this battery 30.

It is possible to output the sensed results to a motor control unit 80.

The second clutch 25 is disposed between the motor generator 20 and the left and right driving wheels 54. The second clutch 25 is arranged to connect and disconnect the power transmission between the motor generator 20 and the left and right driving wheels 54. For example, this second clutch 25 is a wet-type multiple-plate clutch and so on, like the above-described first clutch 15. This second clutch 25 is arranged to engage (including a slip state) or disengage the clutch plates by the hydraulic pressure of a hydraulic pressure unit 26 which is controlled based on the control signal from the transmission control unit 90.

The automatic transmission 40 is a transmission arranged to automatically switch stepwise transmission gear ratios such as seven forward speeds and one rearward speed in accordance with the vehicle speed, the accelerator opening degree, and so on. This automatic transmission 40 is arranged to vary the transmission gear ratio based on the control signal from the transmission control unit 90. As shown in FIG. 1, a special clutch needs not to be newly added as the second clutch 25. It is possible to divert some of a plurality of frictional engagement elements engaged at each shift stage of the automatic transmission 40, as the second clutch 25.

Figure 2:
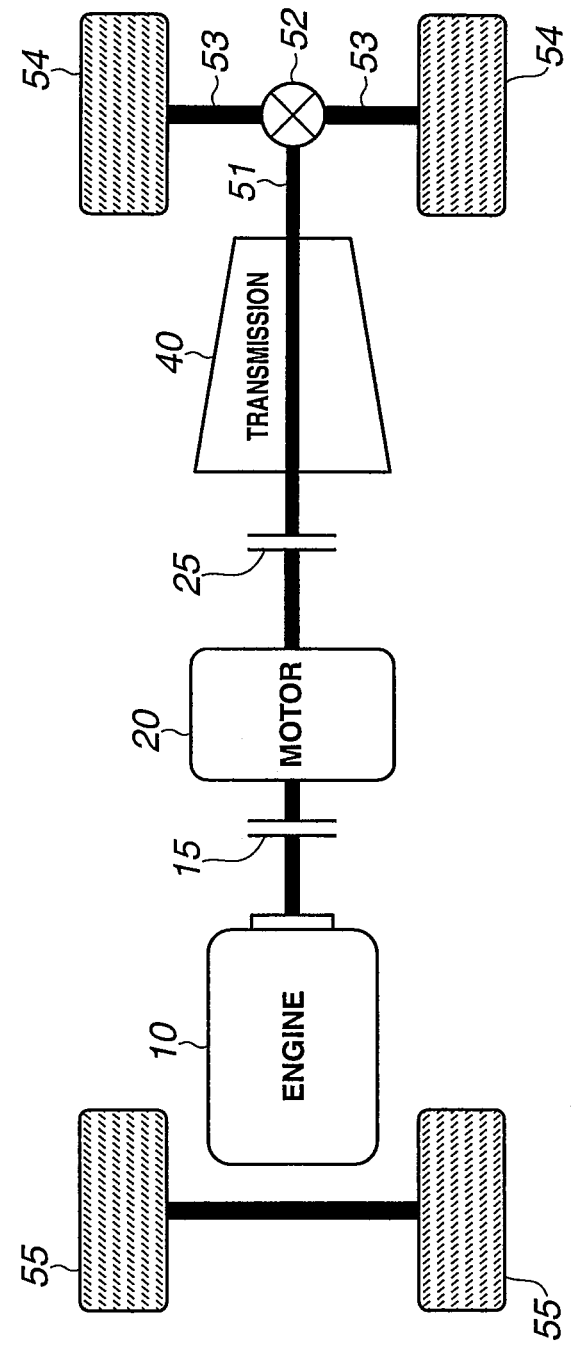
FIG. 2 is a view showing a power train of a hybrid vehicle according to another embodiment of the present invention.

However, the present invention is not limited to these structures. For example, as shown in FIG. 2, the present invention may employ a structure in which the second clutch 25 is disposed between the output shaft of the motor generator 20 and the input shaft of the automatic transmission 40. Alternatively, as shown in FIG. 3, the present invention may employ a structure in which the second clutch 25 is disposed between the output shaft of the automatic transmission 40 and the propeller shaft 51.

Figure 3:
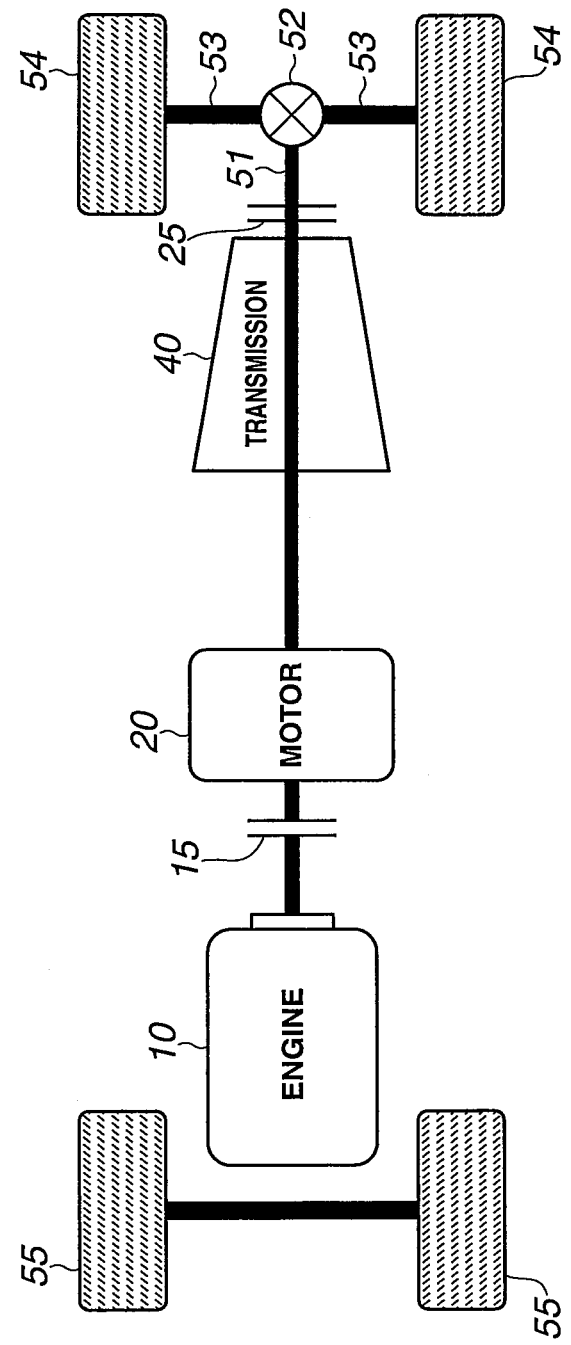
FIG. 3 is a view showing a power train of a hybrid vehicle according to still another embodiment of the present invention.

FIGS. 2 and 3 are views showing the structures of the hybrid vehicle according to the other embodiments. In FIGS. 2 and 3, the structure other than the power train is identical to the structure of FIG. 1. Accordingly, the only power train is shown. Moreover, in FIG. 1 to FIG. 3, the rear-wheel drive hybrid vehicle is exemplified. However, it is possible to employ a front-wheel drive hybrid vehicle and a four-wheel-drive hybrid vehicle.

Figure 4:
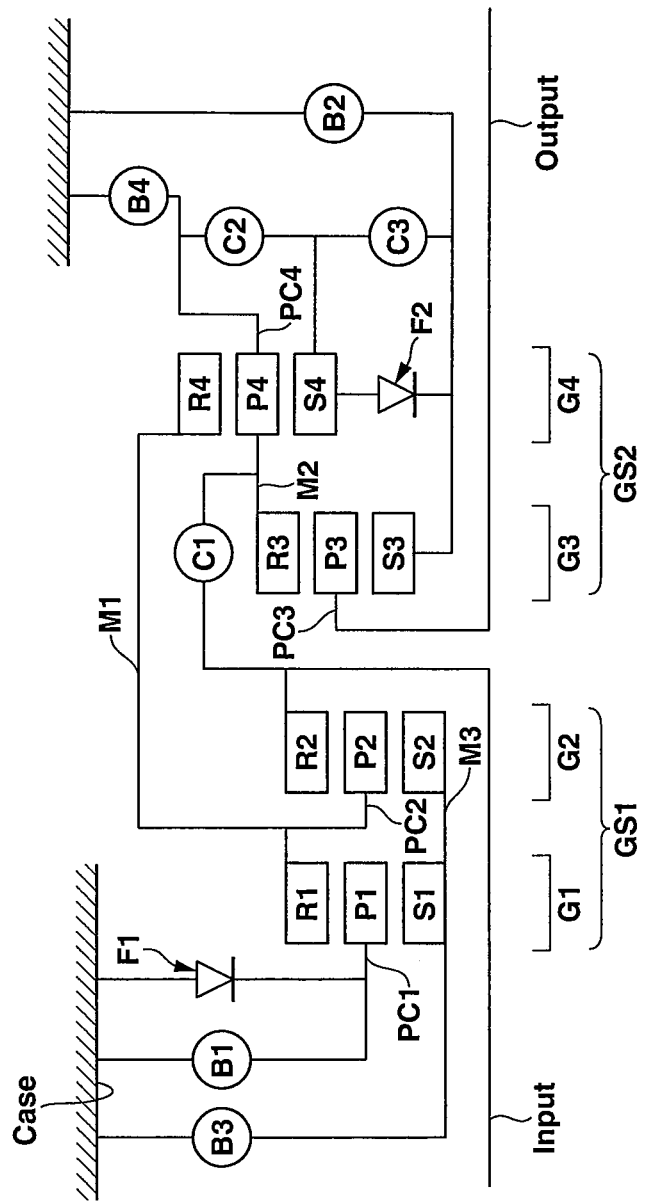
FIG. 4 is a skeleton diagram showing a configuration of an automatic transmission in the embodiments of the present invention.

FIG. 4 is a skeleton diagram showing a configuration of the automatic transmission 40. The automatic transmission 40 includes a first planetary gear set GS1 (a first planetary gear G1 and a second planetary gear G2), and a second planetary gear set GS2 (a third planetary gear G3 and a fourth planetary gear G4). These first planetary gear set GS1 (the first planetary gear G1 and the second planetary gear G2), and the second planetary gear set GS2 (the third planetary gear G3 and the fourth planetary gear G4) are arranged in this order in an axial direction from the input shaft Input's side toward the output shaft Output's side.

Moreover, the automatic transmission 40 includes frictional engagement elements of a plurality of clutches C1, C2, and C3, a plurality of brakes B1, B2, and B3, and a plurality of one-way clutches F1 and F2.

The first planetary gear G1 is a single pinion type planetary gear including a first sun gear S1, a first ring gear R1, and a first carrier PC1 supporting a first pinion P1 engaged with both these gears S1 and R1.

The second planetary gear G2 is a single pinion type planetary gear including a second sun gear S2, a second ring gear R2, and a second carrier PC2 supporting a second pinion P2 engaged with both these gears S2 and R2.

Moreover, the third planetary gear G3 is a single pinion type planetary gear including a third sun gear S3, a third ring gear R3, and a third carrier PC3 supporting a third pinion P3 engaged with both these gears S3 and R3.

Furthermore, the fourth planetary gear G4 is a single pinion type planetary gear including a fourth sun gear S4, a fourth ring gear R4, and a fourth carrier PC4 supporting a fourth pinion P4 engaged with both these gears S4 and R4.

The input shaft Input is connected with the second ring gear R2. The input shaft Input inputs a rotational driving force from the engine 10. The output shaft Output is connected with the third carrier PC3. The output shaft Output transmits the output rotational driving force through a final gear (not shown) and so on to the driving wheels 54.

A first connection member M1 is a member integrally connecting the first ring gear R1, the second carrier PC2, and the fourth ring gear R4. A second connection member M2 is a member integrally connecting the third ring gear R3 and the fourth carrier PC4. A third connection member M3 is a member integrally connecting the first sun gear S1 and the second sun gear S2.

The first planetary gear set GS1 is constituted by connecting the first planetary gear G1 and the second planetary gear G2 by the first connection member M1 and the third connection member M3. The first planetary gear set GS1 is constituted by four rotary elements.

The second planetary gear set GS2 is constituted by connecting the third planetary gear G3 and the fourth planetary gear G4 by the second connection member M2. The second planetary gear set GS2 is constituted by five rotary elements.

The first planetary gear set GS1 includes an input path of torque inputted from the input shaft Input to the second ring gear R2. The torque inputted to the first planetary gear set GS1 is outputted from the first connection member M1 to the second planetary gear set GS2.

The second planetary gear set GS2 includes an input path of torque inputted from the input shaft Input to the second connection member M2, and an input path of torque inputted from the first connection member M1 to the fourth ring gear R4. The torque inputted to the second planetary gear set GS2 is outputted from the third carrier PC3 to the output shaft Output.

Besides, when the H&LR clutch C3 is disengaged and a rotational speed of the fourth sun gear S4 is greater than a rotational speed of the third sun gear S3, the third sun gear S3 and the fourth sun gear S4 generate independent rotational speeds. Accordingly, the third planetary gear G3 and the fourth planetary gear G4 are connected with each other through the second connection member M2. The respective planetary gears attain independent transmission gear ratios.

Moreover, the input clutch C1 is a clutch selectively connecting and disconnecting the input shaft Input and the second connection member M2. The direct clutch C2 is a clutch selectively connecting and disconnecting the fourth sun gear S4 and the fourth carrier PC4. The H&LR clutch C3 is a clutch selectively connecting and disconnecting the third sun gear S3 and the fourth sun gear S4. Besides, the second one-way clutch F2 is disposed between the third sun gear S3 and the fourth sun gear S4.

The front brake B1 is a brake selectively interrupting a rotation of the first carrier PC1. Moreover, the first one-way clutch F1 is disposed parallel to the front brake B1. The low brake B2 is a brake selectively interrupting a rotation of the third sun gear S3. The 2346 brake B3 is a brake selectively interrupting a rotation of the third connection member M3 (the first sun gear S1 and the second sun gear S2). The reverse brake B4 is a brake selectively interrupting a rotation of the fourth carrier PC4.

FIG. 5 is a view showing an engagement operation table showing seven forward speeds and one reverse speed of the automatic transmission 40. "O" in FIG. 5 represents a state where the corresponding clutch or the corresponding brake is engaged. A blank represents a state where it is disengaged. Moreover, "(O)" in FIG. 5 represents that it is engaged only at an engine brake.

Besides, in this embodiment, the frictional engagement elements in the automatic transmission 40 are diverted as the second clutch 25, as described above. The frictional engagement elements surrounded by a bold line in FIG. 5 can be diverted as the second clutch 25. In particular, the low brake B2 is used as the second clutch 25 from the first speed to the third speed, and the H&LR clutch C3 is used as the second clutch 25 from the fourth speed to the seventh speed.

Besides, the present invention is not limited to the above-described stepwise transmission of the seven forward speeds and the one reverse speed. For example, a stepwise transmission of five forward speeds and one reverse speed which is described in Japanese Patent Application Publication No. 2007-314097 may be used as the automatic transmission 40.

Referring back to FIG. 1, the output shaft of the automatic transmission 40 is connected with the left and right driving wheels 54 through the propeller shaft 51, the differential gear unit 52, and the left and right drive shafts 53. Besides, numerals 55 in FIG. 1 are front left and right steered wheels.

The hybrid vehicle 1 in this embodiment can switch three running modes in accordance with the engagement/disengagement states of the first and second clutches 15 and 25.

A first running mode is a motor use running mode (hereinafter, referred to as an "EV running mode") in which the first clutch 15 is disengaged, the second clutch 25 is engaged, and the vehicle runs by using only the power of the motor generator 20 as the power source.

A second running mode is an engine use running mode (hereinafter, referred to as an "HEV running mode") in which both of the first clutch 15 and the second clutch 25 are engaged, and the vehicle runs by using the engine 10 as the power source in addition to the motor generator 20.

A third running mode is a slip running mode (hereinafter, referred to as a "WSC running mode") in which the second clutch 25 is brought to the slip state, and the vehicle runs by using at least one of the engine 10 and the motor generator 20 as the power source. This WSC running mode is a mode to attain a creep running, in particular, when an SOC (amount of charge: State of Charge) is decreased, or when the temperature of the coolant water of the engine 10 is low, and so on.

Besides, when the vehicle is shifted from the EV running mode to the HEV running mode, the disengaged first clutch 15 is engaged, and the engine 10 is started by using the torque of the motor generator 20.

Moreover, the above-described "HEV running mode" includes three running modes of an "engine running mode", a "motor assist running mode", and a "running electric power generation mode".

In "the engine running mode", the driving wheels 54 are driven by using only the engine 10 as the power source. In "the motor assist running mode", the driving wheels 54 are driven by using two of the engine 10 and the motor generator 20 as the power source. In "the running electric power generation mode", the driving wheels 54 are driven by using the engine 10 as the power source, and concurrently the motor generator 20 is acted as the electric generator.

Besides, in addition to the above-illustrated modes, there may be provided a power generation mode in which the motor generator 20 is acted as the electric generator by using the power of the engine 10 at the stop of the vehicle, so as to charge the battery 30, and to supply the electric power to electrical equipments.

As shown in FIG. 1, a control system of the hybrid vehicle 1 in this embodiment includes the integrated control unit 60, the engine control unit 70, the motor control unit 80, and the transmission control unit 90. These respective control units 60, 70, 80, and 90 are connected with each other through, for example, CAN communication lines.

The engine control unit 70 receives sensor information from the crank angle sensor 11 and the water temperature sensor 12 which are provided to the engine 10, and so on. The engine control unit 70 outputs a command to control an engine operating point (an engine speed Ne and an engine torque Te) to a throttle valve actuator, the injector, the spark plug and so on which are provided to the engine 10, in accordance with a command of a target engine torque tTe and so on from the integrated control unit 60. The information of the engine speed Ne and so on is outputted through the CAN communication lines to the integrated control unit 60.

The motor control unit 80 receives information from the resolver 21 provided to the motor generator 20, and so on. The motor control unit 80 outputs a command to control an operating point of the motor generator 20 (a motor rotational speed Nm and a motor torque Tm) to the inverter 35, in accordance with a target motor generator torque tTm and so on from the integrated controller 60. The sensor information of the motor rotational speed Nm and so on is outputted from the motor control unit 80 through the CAN communication lines to the integrated control unit 60.

Moreover, the motor control unit 80 calculates and monitors the SOC of the battery 30 based on a current value and a voltage value which are sensed by the current/voltage sensor 31. This battery SOC information is used for the control information of the motor generator 20. Moreover, the battery SOC information is transmitted through the CAN communication lines to the integrated control unit 60.

The transmission control unit 90 receives a sensor information from an accelerator opening degree sensor 91, a vehicle speed sensor 92, and so on. The transmission control unit 90 controls and drives solenoid valves within the automatic transmission 40 which include the hydraulic pressure unit 26 of the second clutch 25 so as to attain a target second clutch transmission torque capacity tTc1 and a target shift stage along a shift schedule shown in a shift map. Besides, in the shift map used in this case, the target shift stage is previously set based on a vehicle speed VSP and an accelerator opening degree APO. The sensor information of the accelerator opening degree APO, the vehicle speed VSP and so on is outputted from the transmission control unit 90 through the CAN communication lines to the integrated control unit 60.

The integrated control unit 60 integrally controls the operating point of the power train constituted by the engine 10, the motor generator 20, the automatic transmission 40, the first clutch 15, and the second clutch 25. With this, the integrated control unit 60 functions to run the hybrid vehicle 1 effectively.

This integrated control unit 60 calculates the operating point of the power train based on the information obtained from the sensors through the CAN communication lines. The integrated control unit 60 performs the operation control of the engine by a control command to the engine control unit 70, the operation control of the motor generator 20 by a control command to the motor control unit 80, an operation control of the automatic transmission 40 by a control command to the transmission control unit 90, an engagement/disengagement control of the first clutch 15 by a control command to the hydraulic pressure unit 16 of the first clutch 15, and an engagement/disengagement control of the second clutch 25 by a control command to the hydraulic pressure unit 26 of the second clutch 25.

Figure 6:
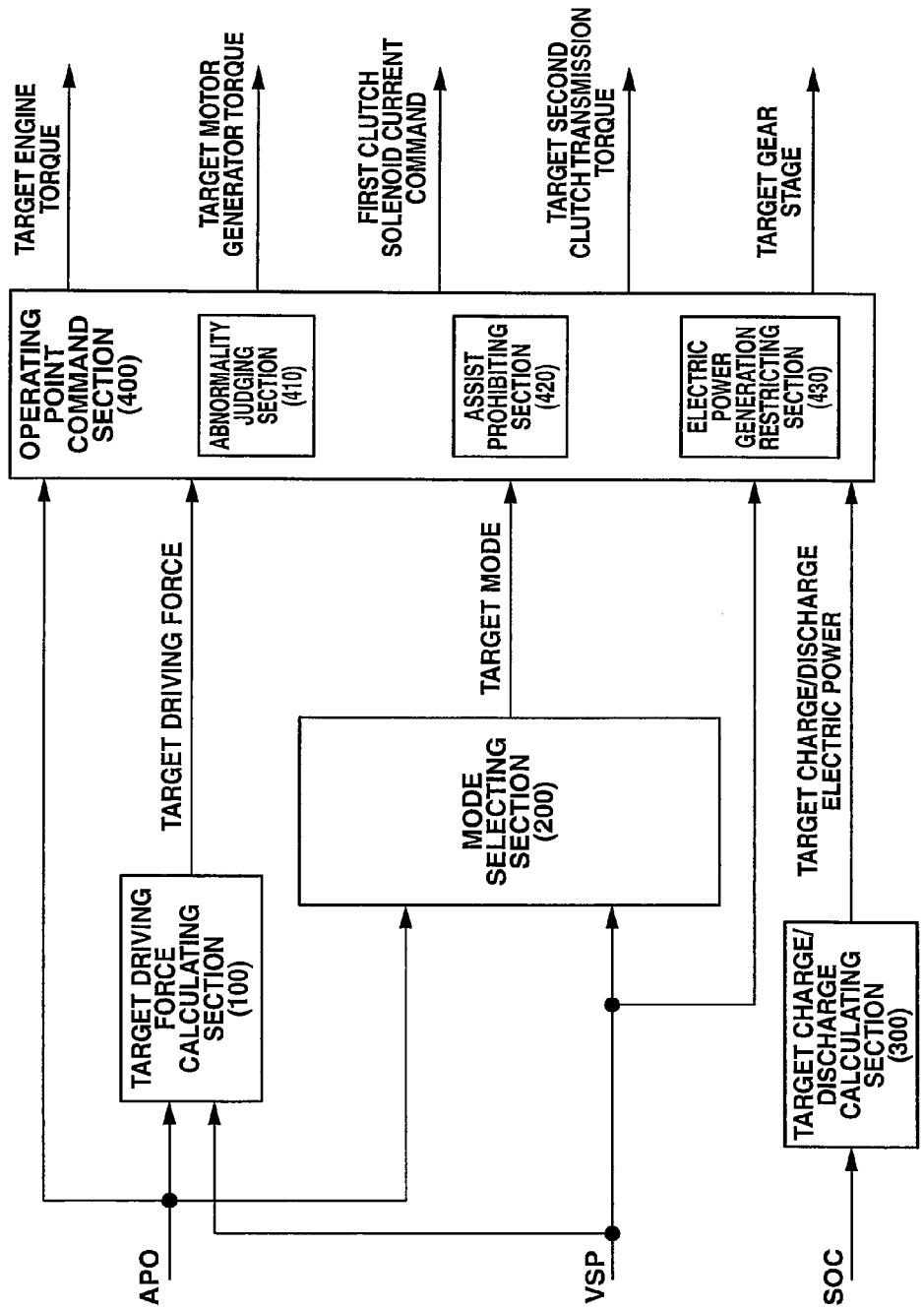
FIG. 6 is a control block diagram showing an integrated control unit in the embodiments of the present invention.

Next, the control performed by the integrated control unit 60 is illustrated. FIG. 6 is a control block diagram of the integrated control unit 60. Besides, a below-illustrated control is performed every 10 msec.

As shown in FIG. 6, the integrated control unit 60 includes a target driving force calculating section 100, a mode selecting section 200, a target charge/discharge calculating section 300, and an operating point command section 400.

Figure 7:
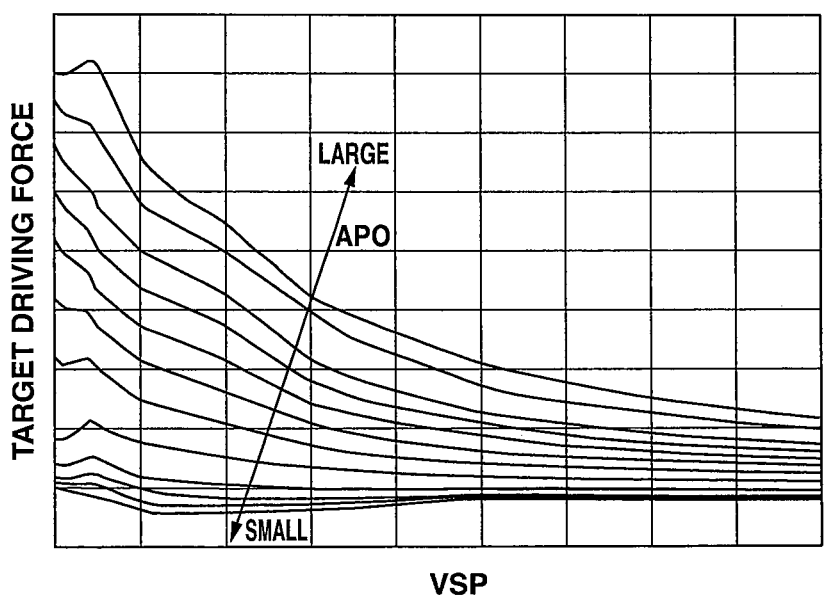
FIG. 7 is a view showing one example of a target driving force map in the embodiments of the present invention.

The target driving force calculating section 100 calculates a target driving force tFo0 by using a previously-set target driving force map, based on the accelerator opening degree APO sensed by the accelerator opening degree sensor 91, and the vehicle speed VSP sensed by the vehicle speed sensor 92. FIG. 7 shows one example of the target driving force map.

Figure 8:
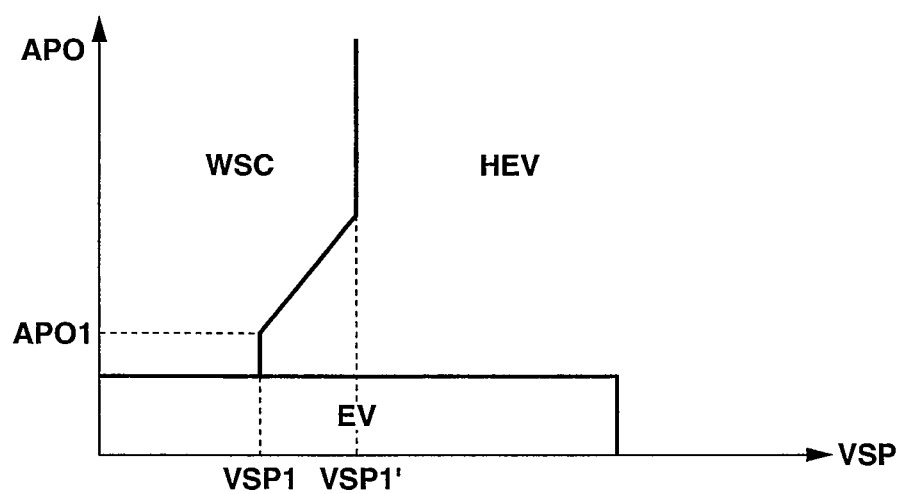
FIG. 8 is a view showing one example of a mode map in the embodiments of the present invention.

The mode selecting section 200 selects the target mode with reference to a previously-set mode map. FIG. 8 shows one example of the mode map. In this mode map of FIG. 8, regions of the EV running mode, the WSC running mode, and the HEV running mode are set in accordance with the vehicle speed VSP and the accelerator opening degree APO.

In this mode map, in a region smaller than a predetermined opening degree APO1, a switching line from the EV running mode or the HEV running mode to the WSC running mode is set in a region lower than a lower limit vehicle speed VSP1 at which the engine speed is smaller than an idling speed of the engine 10 when the automatic transmission 40 is at the first speed. Moreover, in a region equal to or greater than a predetermined opening degree APO1, the WSC running mode is set up to a region of a vehicle speed VSP1' higher than the lower limit vehicle speed VSP1, since a large driving force is required.

Figure 9:
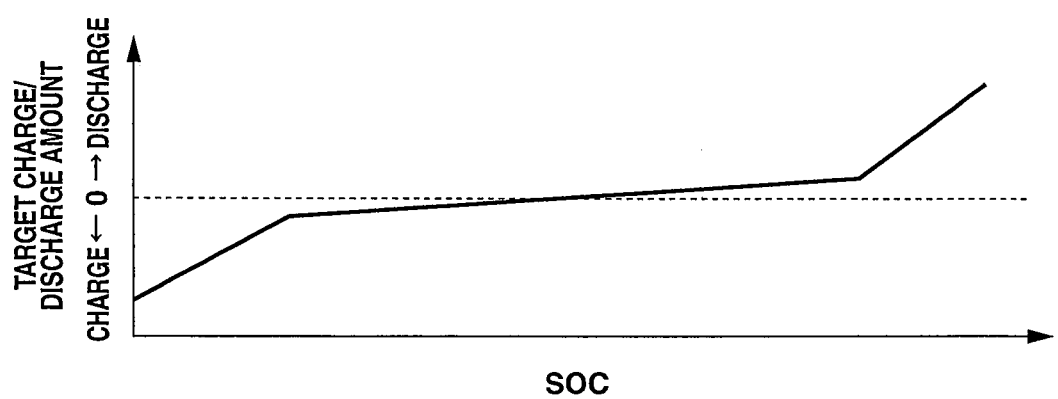
FIG. 9 is a view showing one example of a target change/discharge amount map in the embodiments of the present invention.

The target charge/discharge calculating section 300 calculates the target charge/discharge electric power tP from the SOC of the battery 30 by using the previously-set target charge/discharge amount map. FIG. 9 shows one example of the target charge/discharge amount map.

The operating point command section 400 calculates a transient target engine torque tTe, the target motor generator torque tTm, the first clutch transmission torque capacity tTc1, the target second clutch transmission torque capacity tTc2, and the target shift stage of the automatic transmission 40, as the attainment targets of the operating points of the power train, from the accelerator opening degree APO, the target driving force tFo0, the target mode, the vehicle seed VSP, and the target charge/discharge electric power tP.

The target engine torque tTe is outputted from the integrated control unit 60 to the engine control unit 70. The target motor generator torque tTm is outputted from the integrated control unit 60 to the motor control unit 80. Moreover, the target second clutch transmission torque capacity tTc2 and the target transmission shift stage are outputted from the integrated control unit 60 to the transmission control unit 90.

On the other hand, as to the target first clutch transmission torque capacity tTc1, the integrated control unit 60 supplies a solenoid current corresponding to the target first clutch transmission torque capacity tTc1, to the hydraulic pressure unit 16.

Furthermore, as shown in FIG. 6, the operating point command section 400 includes an abnormality judging section 410, an assist prohibiting section 420, and an electric power generation restricting section 430.

The abnormality judging section 410 judges whether or not an abnormality which may decrease the output torque of the engine 10 is generated in the engine 10.

The abnormality of the engine 10 in this embodiment includes not only a state that there is a possibility that the output torque of the engine 10 may become smaller than the target engine torque tTe due to the malfunction of the engine 10 and so on, but also a state that there is a possibility that the output torque of the engine becomes smaller than the target engine torque tTe by intentionally restricting the output torque of the engine 10 for protecting the engine 10 from the malfunction and so on.

For example, when the water temperature of the engine coolant which is sensed by the water temperature sensor 11 is out of a predetermined range, an actual torque of the engine 10 is more likely to be outputted by a value smaller than the target engine torque tTe. Accordingly, the abnormality judging section 410 judges that the abnormality is generated in the engine 10.

Moreover, for example, when the crank angle sensor 11 is broken down, the output signal from the crank angle sensor 11 to the engine control unit 70 is interrupted. In this case, the engine control unit 70 performs a control to restrict the output torque of the engine 10. Accordingly, it is likely to output by the value smaller than the actual target engine torque tTe of the engine 10. Therefore, the abnormality judging section 410 judges that the abnormality is generated in the engine 10.

Furthermore, for example, when a variable valve timing mechanism (VTC) is broken down, it is not possible to vary the valve timing. Accordingly, the engine control unit 70 performs a control to limit the output of the engine 10. In this case, the actual torque of the engine 10 is likely to be outputted by the value smaller than the target engine torque tTe. Accordingly, the abnormality judging section 410 judges that the abnormality is generated in the engine 10.

Besides, when a torque sensor is provided to the engine 10, the actual torque of the engine 10 which is sensed by this torque sensor may be compared with the target engine torque tTe. In this case, the abnormality judging section 410 judges that the abnormality is generated in the engine 10 when the actual torque of the engine 10 is smaller than the target engine torque tTe.

The assist prohibiting section 420 prohibits the motor generator 20 from being used as the power source in the HEV running mode (that is, the assist running) when the abnormality judging section 410 judges that the abnormality is generated in the engine 10.

The electric power generation restricting section 430 restricts the electric power by the electric power generation of the motor generator 20, to a value equal to or smaller than the electric power necessary for the driving of the auxiliary equipments when the abnormality judging section 410 judges that the abnormality is generated in the engine 10.

For example, the auxiliary equipment is an air conditioner including a compressor and a motor driving the compressor, a power steering including a pump and a motor driving the pump, a hydraulic pressure brake including a pump and a motor driving the pump, a navigation system, a car audio system, a headlight, a fan motor of a radiator and so on.

Figure 10:
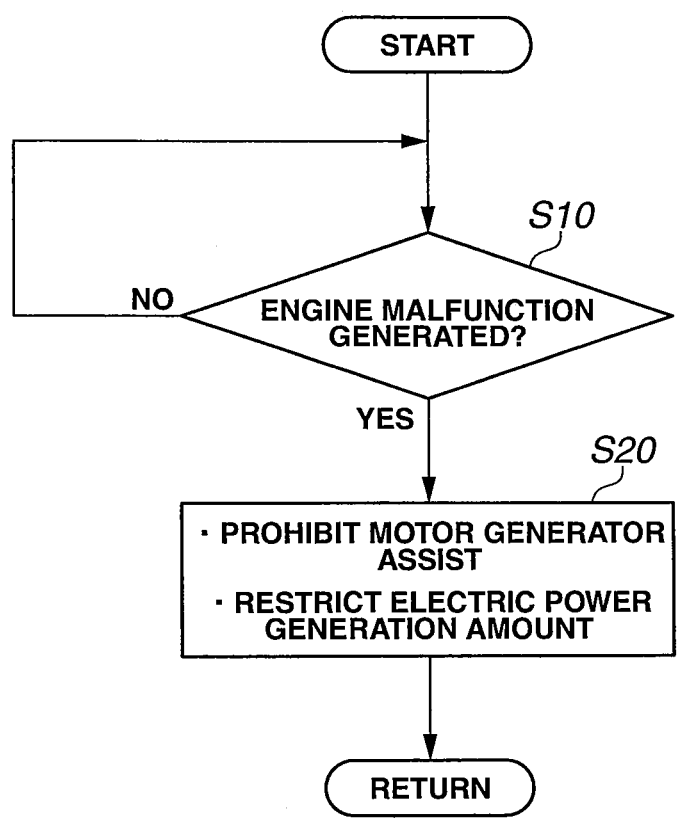
FIG. 10 is a flowchart showing an assist prohibition control in the embodiments of the present invention.
Figure 11:
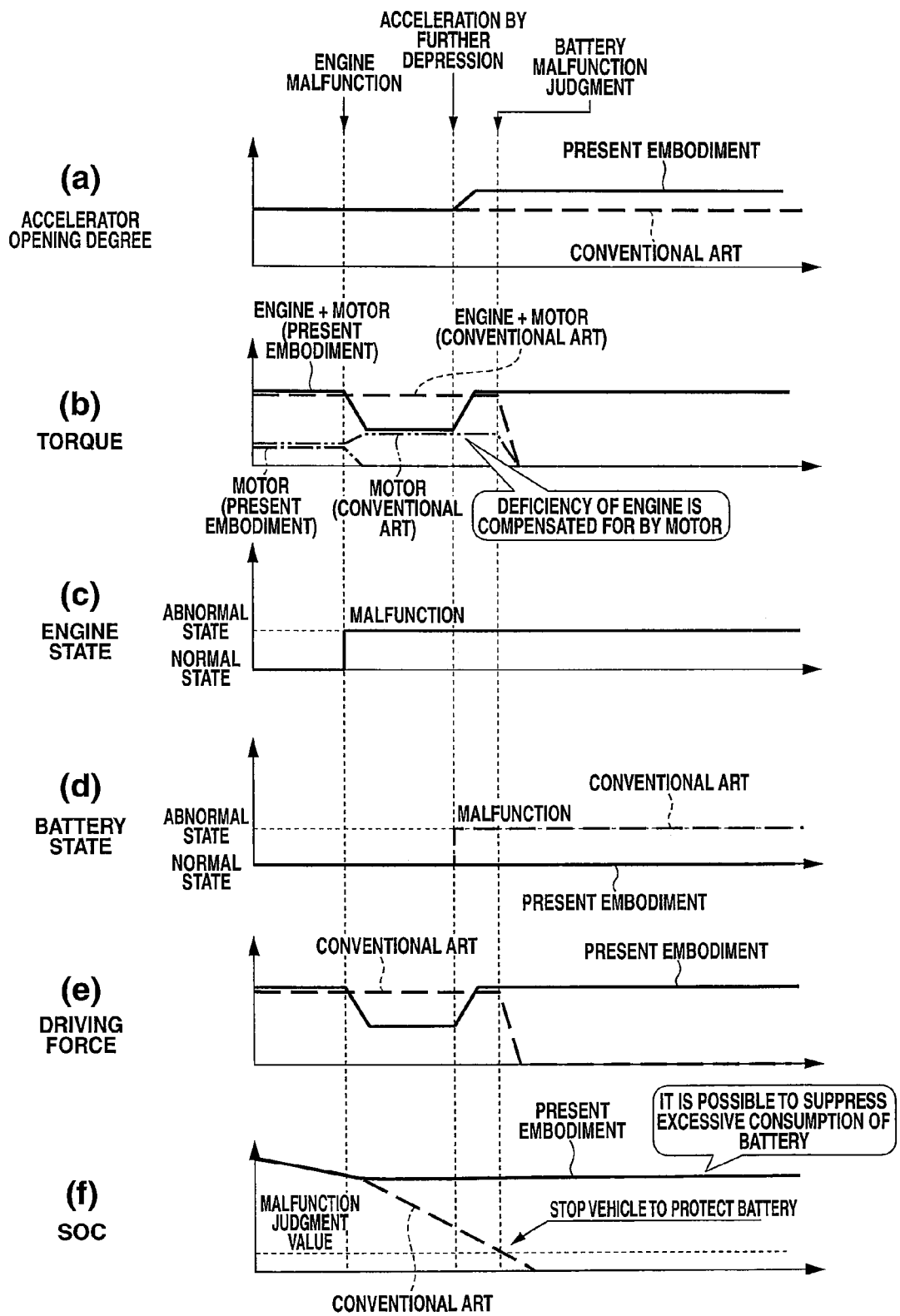
FIGS. 11(a)-11(f) are time charts showing one example of a flow of the assist prohibition control in the embodiments of the present invention.

Hereinafter, the assist prohibition control of the hybrid vehicle 1 in this embodiment is illustrated with reference to FIG. 10 to FIG. 12. FIG. 10 is a flowchart showing the assist prohibition control in this embodiment. FIG. 11 and FIG. 12 are time charts showing flows of the assist prohibition control in this embodiment.

The assist prohibition control illustrated below is performed in the motor assist running mode or the running electric power generation mode of the above-described HEV running mode.

First, at step S10 of FIG. 10, the abnormality judging section 410 of the integrated control unit 60 judges whether or not the abnormality is generated in the engine 10.

At step S10, when it is judged that the abnormality is not generated in the engine (NO at step S10), the monitoring of the engine 10 is continued.

On the other hand, when it is judged that the abnormality is generated in the engine 10 at step S10, at step S20, the assist prohibition section 420 prohibits the motor generator 20 from being used as the driving source (cf. a solid line and an alternate long and short dash line of FIG. 11(b)).

On the other hand, when the hybrid vehicle 1 runs in the running electric power generation mode of the HEV running mode, at step S20, the power generation restricting section 430 replaces the target charge/discharge electric power tP outputted from the target charge/discharge calculating section 300, by (with) the minimum electric power necessary for driving the auxiliary equipments. With this, the electric power of the power generation of the motor generator 20 is restricted.

In a case where the motor generator 20 is continued to be used as the driving source (that is, the assist running is continued) in a state where the engine torque is not sufficiently outputted due to the malfunction of the engine 10 and so on, the SOC of the battery 30 is decreased to a malfunction judgment value. Consequently, the hybrid vehicle 1 is stopped for protecting the battery 30 (cf. dashed lines in FIGS. 11(d) to (f)).

On the other hand, in this embodiment, when the abnormality which may decrease the output torque is generated in the engine 10, the use of the motor generator 20 in the HEV running mode (that is, the assist running) is prohibited. Accordingly, it is possible to protect the battery 30, and also to continue the running of the hybrid vehicle 1 (cf. solid lines of FIGS. 11 (d) to (f)).

Moreover, in this embodiment, when the abnormality which may decrease the output torque is generated in the engine 10 when the motor generator 20 performs the electric power generation in the HEV running mode, the electric power of the electric power generation of (by) the motor generator 20 is restricted to the electric power necessary for driving the auxiliary equipment. Accordingly, it is possible to prevent the speed reduction of the hybrid vehicle 1 due to the power generation torque becoming greater than the engine torque (cf. FIGS. 12 (b) and (d)).

Besides, the abnormality judging section 410 in this embodiment corresponds to one example of an abnormality judging means in the present invention. The assist prohibition section 420 in this embodiment corresponds to one example of an assist prohibition means in the present invention. The electric power generation restricting section 430 in this embodiment corresponds to one example of an electric power generation restricting means in the present invention.

Besides, the above-described embodiments are described for facilitating the understanding of the present invention. The above-described embodiments are not described for limiting the present invention. Accordingly, the elements disclosed in the above-described embodiments include all design changes and equivalents belong to art region of the present invention.

The invention claimed is:

1. A hybrid vehicle control system comprising:
   an internal combustion engine configured for a hybrid vehicle;
   a motor generator;
   a battery arranged to be charged by and to discharge to the motor generator; and
   a controller configured to:
      judge whether or not an abnormality that an output torque of the internal combustion engine is outputted as a value smaller than a target torque is generated in the internal combustion engine; and
      prohibit the motor generator from being used as a power source when the abnormality is generated in the internal combustion engine;
      wherein the controller is further configured to restrict an electric power of an electric power generation of the motor generator to be a value equal to or smaller than a predetermined value when the abnormality is generated in the internal combustion engine;
      wherein the predetermined value is an amount of electric power necessary for driving auxiliary equipment.

2. The hybrid vehicle control system as claimed in claim 1, wherein the internal combustion engine is configured for a front-wheel drive hybrid vehicle or a four-wheel drive hybrid vehicle.

3. The hybrid vehicle control system as claimed in claim 1, wherein the auxiliary equipment is selected from the group consisting of an air conditioner, a power steering device, a hydraulic pressure brake, a navigation system, a car audio system, a headlight and a fan motor of a radiator.

* * * * *